United States Patent
Criswell et al.

(10) Patent No.: US 9,984,000 B2
(45) Date of Patent: May 29, 2018

(54) ELECTRONIC DEVICE DATA DISTRIBUTION

(71) Applicants: LYVE MINDS, INC., Cupertino, CA (US); Seagate Technology LLC, Minneapolis, MN (US)

(72) Inventors: Jon Criswell, Saratoga, CA (US); Jian Liang, San Jose, CA (US); Rex Yik Chun Ching, Sunnyvale, CA (US); James Edward Dykes, Longmont, CO (US)

(73) Assignee: LYVE MINDS, INC., Cupertino, CA (US)

( * ) Notice: Subject to any disclaimer, the term of this patent is extended or adjusted under 35 U.S.C. 154(b) by 0 days. days.

(21) Appl. No.: 14/480,403

(22) Filed: Sep. 8, 2014

(65) Prior Publication Data

US 2015/0074340 A1 Mar. 12, 2015

Related U.S. Application Data

(60) Provisional application No. 61/874,926, filed on Sep. 6, 2013, provisional application No. 61/874,930, filed
(Continued)

(51) Int. Cl.
*G06F 12/00* (2006.01)
*G06F 13/00* (2006.01)
(Continued)

(52) U.S. Cl.
CPC ...... *G06F 12/0868* (2013.01); *G06F 12/0888* (2013.01); *G06F 12/122* (2013.01);
(Continued)

(58) Field of Classification Search
CPC .. G06F 12/0246; G06F 12/0866; G06F 12/12; G06F 1/3268
(Continued)

(56) References Cited

U.S. PATENT DOCUMENTS

| 6,449,695 B1 | 9/2002 | Bereznyi et al. |
| 7,395,452 B2 * | 7/2008 | Nicholson ............... G06F 1/30 |
| | | 711/E12.04 |

(Continued)

FOREIGN PATENT DOCUMENTS

| EP | 0706135 A1 * | 4/1996 | ........... G06F 12/123 |
| EP | 2 378 427 A1 | 10/2011 | |

(Continued)

OTHER PUBLICATIONS

International Search Report dated Dec. 19, 2014 as received in Application No. PCT/US2014/054624.
(Continued)

*Primary Examiner* — Edward Dudek, Jr.
*Assistant Examiner* — Sidney Li
(74) *Attorney, Agent, or Firm* — Schwegman Lundberg & Woessner, P.A.

(57) ABSTRACT

A non-transitory computer-readable storage medium may include instructions that cause a system to perform operations, the operations may include receiving an operation associated with data and managing storage of the data on a first storage medium of an electronic device and in a cache on a second storage medium of the electronic device based on the operation and a cache policy. The cache policy may be based on one or more characteristics of the data that include a duration since a previous access of the data.

20 Claims, 6 Drawing Sheets

Related U.S. Application Data on Sep. 6, 2013, provisional application No. 61/875,625, filed on Sep. 9, 2013, provisional application No. 61/875,627, filed on Sep. 9, 2013.

(51) Int. Cl.

| | | |
|---|---|---|
| *G06F 13/28* | (2006.01) | |
| *G06F 12/0868* | (2016.01) | |
| *G06F 12/122* | (2016.01) | |
| *G06F 12/0888* | (2016.01) | |
| G06F 12/12 | (2016.01) | |
| G06F 12/0866 | (2016.01) | |
| G06F 12/02 | (2006.01) | |
| G06F 1/32 | (2006.01) | |

(52) U.S. Cl.
CPC ........ *G06F 1/3268* (2013.01); *G06F 12/0246* (2013.01); *G06F 12/0866* (2013.01); *G06F 12/12* (2013.01); *G06F 2212/217* (2013.01); *G06F 2212/222* (2013.01); *Y02D 10/13* (2018.01)

(58) Field of Classification Search
USPC .......................................................... 711/103
See application file for complete search history.

(56) References Cited

U.S. PATENT DOCUMENTS

| | | | |
|---|---|---|---|
| 8,028,137 B2 | 9/2011 | Wach et al. | |
| 8,078,794 B2 | 12/2011 | Lee et al. | |
| 8,327,076 B2* | 12/2012 | Murphy | G06F 12/0866 |
| | | | 711/135 |
| 8,463,984 B2 | 6/2013 | Olds et al. | |
| 8,560,770 B2 | 10/2013 | Haines et al. | |
| 2003/0051068 A1* | 3/2003 | Eldridge | G06F 9/4428 |
| | | | 719/318 |
| 2003/0061352 A1* | 3/2003 | Bohrer | G06F 17/30902 |
| | | | 709/226 |
| 2005/0071561 A1* | 3/2005 | Olsen | G06F 1/3221 |
| | | | 711/118 |
| 2005/0125414 A1* | 6/2005 | Navas | G06F 17/30011 |
| 2007/0162462 A1* | 7/2007 | Zhang | G06F 17/30067 |
| 2007/0168564 A1* | 7/2007 | Conley | G06F 12/0866 |
| | | | 710/1 |
| 2011/0184970 A1* | 7/2011 | Nakashiro | G06F 17/302 |
| | | | 707/769 |
| 2011/0238662 A1* | 9/2011 | Shuster | G06F 17/30554 |
| | | | 707/728 |
| 2013/0198460 A1* | 8/2013 | Ochi | G06F 12/121 |
| | | | 711/133 |
| 2014/0013027 A1 | 1/2014 | Jannyavula Venkata et al. | |
| 2014/0082310 A1* | 3/2014 | Nakajima | G06F 12/0862 |
| | | | 711/162 |

FOREIGN PATENT DOCUMENTS

| | | | | |
|---|---|---|---|---|
| WO | 2011/031796 A2 | 3/2011 | | |
| WO | WO 2011031796 A2 * | 3/2011 | ......... | G06F 12/0246 |
| WO | WO-2015035343 A1 | 3/2015 | | |

OTHER PUBLICATIONS

Written Opinion of the International Searching Authority dated Dec. 19, 2014 as received in Application No. PCT/US2014/054624.
"Adaptive Memory Technology in Solid State Hybrid Drives," 3 pages, http://www.seagate.com/tech-insights/adaptive-memory-in-sshd-master-ti/, United States, Accessed Sep. 16, 2014, 3 pages.
"Solid State Hybrid Drives for Laptops," 6 pages, http://www.seagate.com/internal-hard-drives/solid-state-hybrid/laptop-solid-state-hybrid-drive/, United States, Accessed Sep. 16, 2014.
"International Application Serial No. PCT/US2014/054624, International Preliminary Report on Patentability dated Mar. 17, 2016", 11 pgs.

* cited by examiner

US 9,984,000 B2

ELECTRONIC DEVICE DATA DISTRIBUTION

CROSS-REFERENCE TO RELATED APPLICATIONS

This application is based upon and claims the benefit of priority of U.S. Provisional Application No. 61/874,926, filed on Sep. 6, 2013; U.S. Provisional Application No. 61/874,930, filed on Sep. 6, 2013; U.S. Provisional Application No. 61/875,625, filed on Sep. 9, 2013; and U.S. Provisional Application No. 61/875,627 filed on Sep. 9, 2013. The forgoing applications are incorporated herein by reference in their entirety.

FIELD

The embodiments discussed herein are related to data distribution in an electronic device.

BACKGROUND

The amount of data that users desire to store on portable electronic devices is increasing. Most portable electronic devices utilize solid-state memory such as flash memory for storage because of its relatively low power consumption and robust nature as compared to spinning storage such as hard disk drives. However, solid-state memory with large amounts of storage space may be expensive.

The subject matter described herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, A non-transitory computer-readable storage medium may include instructions that cause a system to perform operations, the operations may include receiving an operation associated with data and managing storage of the data on a first storage medium of an electronic device and in a cache on a second storage medium of the electronic device based on the operation and a cache policy. The cache policy may be based on one or more characteristics of the data that include a duration since a previous access of the data.

The object and advantages of the embodiments will be realized and achieved at least by the elements, features, and combinations particularly pointed out below.

It is to be understood that both the foregoing general description and the following detailed description are exemplary and explanatory and are not restrictive of the present disclosure.

BRIEF DESCRIPTION OF THE DRAWINGS

Example embodiments will be described and explained with additional specificity and detail through the use of the accompanying drawings in which.

DESCRIPTION OF EMBODIMENTS

As described in further detail below, an electronic device may include a first storage medium (e.g., a hard disk drive (HDD)) that may provide for a large amount of storage space on the electronic device at a significantly lower cost than using a second storage medium (e.g., a solid-state drive (SSD)) to obtain the same amount of storage space. However, accessing data and files on the first storage medium (e.g., HDD) may consume a significant amount of energy, which may be problematic for many electronic devices—especially portable, battery-powered electronic devices where increased battery life and decreased energy consumption may be a high priority. As such, as explained in detail below, the electronic device may also include the second storage medium (e.g., an SSD) that may consume less energy than the first storage medium, but that may be more expensive than the first storage medium with respect to storage capacity.

The electronic device may also include a storage manager where the storage manager may be configured to manage data storage on the first and second storage media such that the relatively low energy consumption of the second storage medium and the relatively large storage capacity of the first storage medium may be utilized to allow for use of the first storage medium in the electronic device while reducing power consumed by accessing the first storage medium. Therefore, the storage manager may allow for the electronic device to have a relatively large and inexpensive storage capacity through the use of the first storage medium while reducing and/or minimizing the negative effects of increased power consumption associated with the first storage medium.

Figure 1:
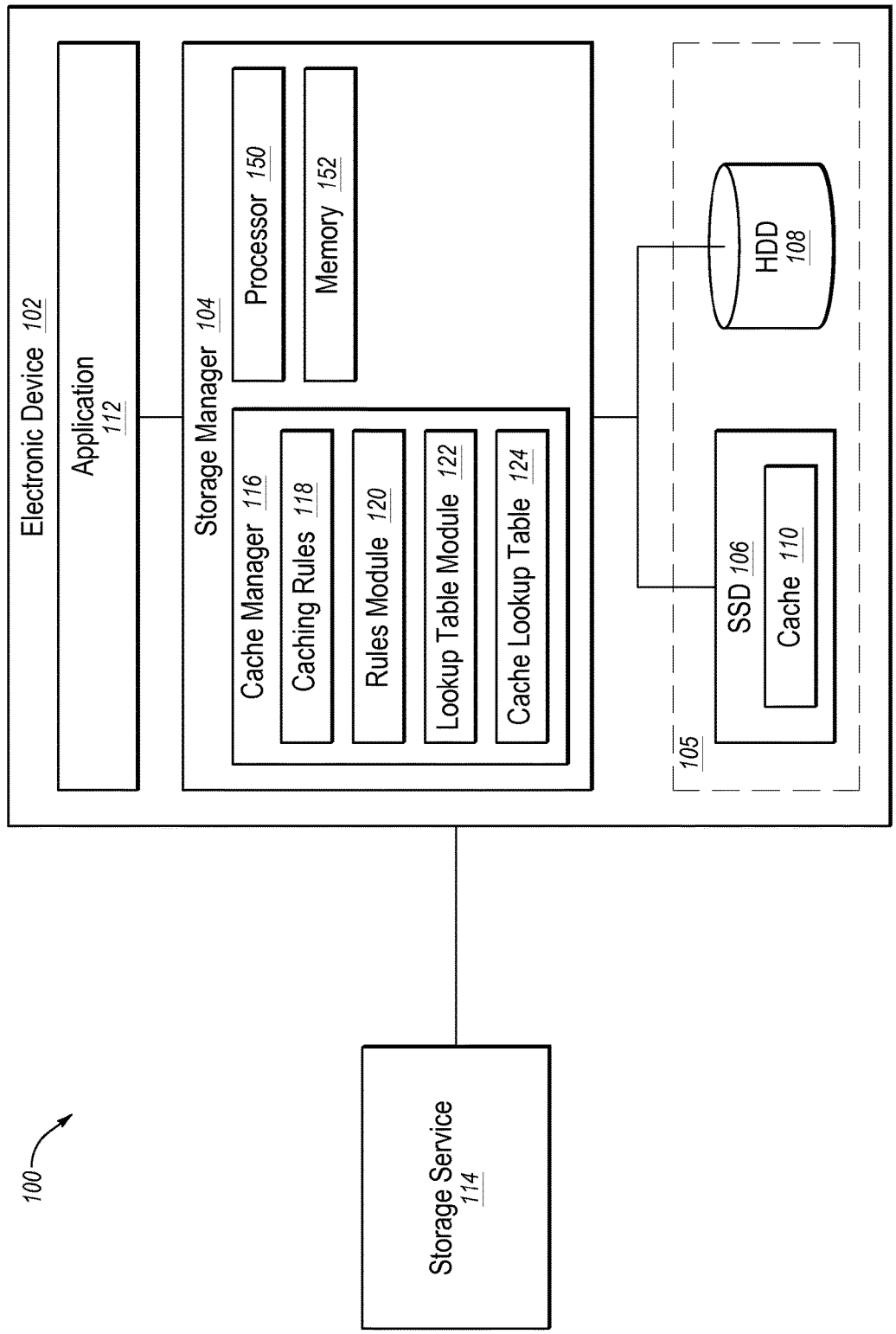
FIG. 1 illustrates an example system configured to manage data storage on an electronic device.

FIG. 1 illustrates a block diagram of an example system 100 configured to manage data storage on an electronic device 102, according to at least one embodiment of the present disclosure. In some embodiments, the electronic device 102 may include an application 112, a storage manager 104, and a storage space 105 that may include an SSD 106 and an HDD 108.

The SSD 106 may include any suitable solid-state memory drive and may include Electrically Erasable Programmable Read-Only Memory (EEPROM) and/or flash memory, by way of example. In the present disclosure, use of the term "SSD" may refer to any suitable type of solid-state storage media and is not limited to "drives" per se. The HDD 108 may include any type of hard disk drive and may include any suitable computer-readable media configured to be accessed by spinning a component of the HDD 108.

The application 112 may include any suitable software or hardware application of the electronic device 102 that may be configured to direct operations associated with data that may be read from and/or written to the storage space 105. The operations may include any number of applicable operations including open and close operations which may also be associated with read and/or write operations. In some embodiments, the data may have various characteristics such as data size, frequency of access of the data, duration since a previous access of the data, and type of the data such as whether the data is configured as a file or as a directory as well as format or file type.

The storage manager 104 may be configured to intercept operations intended for the storage space 105 (e.g., operations intended for the storage space 105 as directed by the application 112). The storage manager 104 may include a cache manager 116 configured to manage storage of the data on the HDD 108 and in a cache 110 of the SSD 106 based on the operations as well as a cache policy, which may be applied according to the different operations in some embodiments.

In some embodiments, the cache policy may be based on reducing or minimizing accessing the HDD 108. Accessing the HDD 108 may result in causing the HDD 108 to spin (also referred to as "spinning up"), which may consume a relatively large amount of energy. Therefore, reducing or minimizing accessing the HDD 108 may reduce overall energy consumption. In some embodiments, the cache policy may be based on storing data on the cache 110 that is most likely to be accessed such that the data may be accessed without accessing the HDD 108.

For example, in some embodiments, the cache policy may be based on frequency of access of data and data types such that data, data types, and/or related data that are more frequently accessed may be prioritized as being stored on the cache 110 over data, data types, and/or related data that is less frequently accessed. Similarly, the cache policy may be based on a number of times that data and data types may be accessed such that data, data types, and/or related data that have been accessed a relatively large number of times may be prioritized as being stored on the cache 110 over data, data types, and/or related data that have been accessed a relatively small number of times. Related data may include data having a similar data type, similar metadata (e.g., similar timestamps, similar location information, similar tagging, etc.).

Further, many times recently stored, created, and/or accessed data is more likely to be accessed than less recently stored, created, and/or accessed data. Therefore, in some embodiments, the cache policy may be based on a duration of time from when data was stored, created, and/or accessed.

Additionally, in some embodiments the cache 110 may have limited storage space. Therefore, in these and other embodiments, the cache policy may be based on file sizes of the data so as to not fill the cache 110 with a relatively small number of files, which may cause more frequent access of the HDD 108. For example, the cache policy may be based on storing in the cache 110 data with file sizes that allow for a relatively large number of files to be stored in the cache 110. sizes of files where the HDD 108 not spinning up often to access data that may not fit on the cache 110 because the cache 110 is full of a relatively small number of files or data sets. As such, the cache policy may be based on a potential number of files or data sets that the cache 110 may be capable of storing, which may be based on a maximum allowed size of files that may be stored in the cache 110.

Further, as mentioned above, data may be transferred from the HDD 108 to the cache 110 as part of energy savings associated with the electronic device 102. However, the transfer or copying of large files from the HDD 108 to the cache 110 may cause the HDD 108 to spin up for a relatively long period of time, which may use a lot of energy such that potential energy savings may be reduced or eliminated.

Accordingly, the cache policy may be based on storing in the cache 110 files with sizes that may allow for desired energy savings where the HDD 108 is not spinning for relatively long periods of time because of large files or data sets being transferred to the cache 110. As such, in some embodiments, the cache policy may be based on a relationship between file sizes and spinning time of the HDD 108 in which data with corresponding file sizes that may correspond to relatively long spin times may not be cached.

In some embodiments, the cache policy may be based on file size and available storage space on the cache 110 such that partial files may not be stored on the cache 110. Storing a portion of a file on the cache 110 and a portion of the same file on the HDD 108 may still result in the HDD 108 spinning up when that particular file is accessed. Therefore, energy savings may be increased by not partially storing files in the cache 110.

In some embodiments, the cache manager 116 may include a set of caching rules 118 that may be based on the cache policy. For example, the caching rules 118 may include specific data characteristics that may dictate when to store data in the cache 110 and/or when to remove data from the cache 110. In some embodiments, the caching rules 118 may include values such as file sizes, file access frequencies (e.g., how many times files may be accessed in a certain period of time), how many times a file has been accessed total, and/or durations since the last access to files that may dictate whether or not data should be stored in the cache 110 or removed from the cache 110. In some embodiments, the caching rules 118 may also include weights for the different data characteristics such that some data characteristics may be given a higher priority and/or more deference than other data characteristics in determining whether or not to store data on or remove data from the cache 110.

The cache manager 116 may also include a rules module 120 in some embodiments. The rules module 120 may be configured to apply the caching rules 118 to data to determine whether the data should be stored on or removed from the cache 110. In some embodiments, the rules module 120 may be configured to assign a cache relevancy score and/or a cache relevancy rank to the data based on the cache policy and the caching rules 118 where the cache relevancy score and/or rank may dictate whether the data should be stored on or removed from the cache 110.

For example, in some embodiments, the rules module 120 may assign the cache relevancy score according to the following principles:

Possible scores: 1 2 3(high/low/do not cache)

Score=$(c1)?3-c2-c3:3$

Where:
 $c1$=(file size<MaxFileSize);
 $c2$=(current time<last access time+MinFileLife);
 $c3$=(file access frequency>MinAccessFrequency).

In the above principles, "MaxFileSize" may represent the largest file size that may be cached, "MinAccessFrequency" may represent a minimum count of times that a file may be accessed over a period of time, and "MinFileLife" may represent a duration since the last time that a file was accessed, created, or stored.

In some embodiments, the different factors used to generate the cache relevancy score may be given different weights such that some factors may influence the cache relevancy score more than others. For example, in some embodiments, one or more of the file size, the last access time, and the file access frequency may be given different weights for generating the cache relevancy score.

The rules module 120 may also be configured to determine whether the data should be stored on or removed from the cache 110 based on the operations requested by the application 112 and/or based on a power policy associated with when the electronic device 102 includes a battery as a power source. In some embodiments, the power policy may be based on a power state of the electronic device 102 as described below. In some embodiments, the rules module 120 may be configured to determine whether to store data in or remove data from the cache 110 based on the operations, the power policy, and/or the cache policy according to methods 200-500, discussed with respect to FIGS. 2-5 below.

In some embodiments, the cache manager 116 may be configured to modify the cache policy and/or the rules module 120 may be configured to modify the caching rules 118 over time according to use of the electronic device 102 and/or the data that may be stored in the storage space 105 of the electronic device 102. For example, usage patterns of the data and the electronic device 102 may be monitored and may indicate data types (e.g., music files, photo files, video files) that may be commonly accessed, an access frequency of particular data and/or particular data types, a relationship between how recently data was stored, created, and/or accessed, a number of times that particular data (e.g., a particular file) or a particular data type may be accessed, and subsequent accessing of the data, etc. As such, the cache policy and/or the caching rules 118 may be modified based on the usage patterns to include in the cache 110 the data that may be more likely to be accessed. The improved caching may help better achieve the objectives (e.g., reduced power consumption) of the cache policy.

By way of example, in some embodiments, the use may indicate that different values for file sizes, file access frequencies, and/or durations since previous accesses to files and/or their respective weights that may be included in the caching rules 118 may be modified. For example, with respect to the principles described above for generating the cache relevancy score, the "MaxFileSize" may be adjusted over time according to usage such that it may represent a value that covers sizes of data most accessed by a user (e.g., music file sizes, photo file sizes, video file sizes, etc.). Additionally, the "MinAccessFrequency" may be adjusted over time based on usage patterns such that it may be related to an access frequency of particular data and particular data types that may more accurately predict the probability of future access of the particular data, the particular data type and/or data that may be related to the particular data and particular data type. Further, "MinFileLife" may be tuned according to usage patterns (e.g., a relationship between how recently data was stored, created, and/or accessed and subsequent accessing of the data) such that it may be related to a probability of future access of data that may have been recently stored, created, and/or accessed, as indicated by prior use.

In some embodiments, the rules module 120 may be configured to change the caching rules 118 based on instructions or suggestions received from an external service or module such as a storage service 114 communicatively coupled to the electronic device 102 and configured to assist in management of the storage space 105 of the electronic device 102. In some embodiments, the storage service 114 may be configured to monitor the usage patterns of the electronic device 102 and associated data to determine changes that may be made to the caching rules 118. In these or other embodiments, the rules module 120 may also be configured to monitor the usage patterns of the electronic device 102 and associated data to determine changes that may be made to the caching rules 118. In some embodiments, the rules module 120 may be configured to determine whether or not to implement suggestions by the storage service 114 to change the caching rules 118.

The cache manager 116 may also include a cache lookup table 124 and an associated lookup table module 122. The cache lookup table 124 may be configured to include which data and associated files may be stored in the cache 110. In some embodiments, the cache lookup table 124 may also include scores and/or ranks of the data as ranked or scored according to the cache policy such that priorities with respect to maintaining storage of the data in the cache 110 may be determined. The lookup table module 122 may be communicatively coupled to the rules module 120 and the cache lookup table 124 and may be configured to update the cache lookup table 124 as data is removed from or added to the cache lookup table 124.

In some embodiments, the storage manager 104 may include a processor 150 and a memory 152. The processor 150 may include, for example, a microprocessor, microcontroller, digital signal processor (DSP), application-specific integrated circuit (ASIC), a Field-Programmable Gate Array (FPGA), or any other digital or analog circuitry configured to interpret and/or to execute program instructions and/or to process data. In some embodiments, the processor 150 may interpret and/or execute program instructions and/or process data stored in the memory 152. Although illustrated as including a single processor, reference to the processor 150 may include any number of processors configured to individually or collectively perform one or more of the operations of the processor 150.

The memory 152 may include any suitable computer-readable media configured to retain program instructions and/or data for a period of time. By way of example, and not limitation, such computer-readable media may include tangible computer-readable storage media including, Random Access Memory (RAM), Read-Only Memory (ROM), Electrically Erasable Programmable Read-Only Memory (EEPROM), Compact Disk Read-Only Memory (CD-ROM) or other optical disk storage, magnetic disk storage or other magnetic storage devices, flash memory devices (e.g., solid-state memory devices), a specific molecular sequence (e.g., DNA or RNA), or any other storage medium which may be used to carry or store desired program code in the form of computer-executable instructions or data structures and which may be accessed by the processor 150. Combinations of the above may also be included within the scope of computer-readable media. Computer-executable instructions may include, for example, instructions and data that cause a general-purpose computer, special-purpose computer, or special-purpose processing device (e.g., the processor 150) to perform a certain function or group of functions.

In some embodiments, the memory 152 may be configured to include instructions associated with operations that may be associated with the storage manager 104 and the cache manager 116 such that the processor 150 may be configured to execute the operations associated with the cache manager 116 and the storage manager 104. Accordingly, in some embodiments, the processor 150 and the memory 152 may be part of an implementation of the cache manager 116 and the storage manager 104.

Modifications, additions, or omissions may be made to the storage system 100 without departing from the scope of the present disclosure. For example, the processor 150 and/or the memory 152 may not necessarily be included in the storage manager 104, but may be included elsewhere in the electronic device 102 but may be configured to perform the operations of the storage manager 104. As another example, in some embodiments, the SSD 106 may be included with the HDD 108 as a drive-level hybrid system and in other embodiments the SSD 106 may be separate from the HDD 108. Additionally, the individual modules and elements of the electronic device 102 are merely to provide an understanding to and illustrate the different functionality associated with the caching described herein. Accordingly, different implementations of the caching that include different elements or modules are within the scope of the present disclosure.

Figure 2:
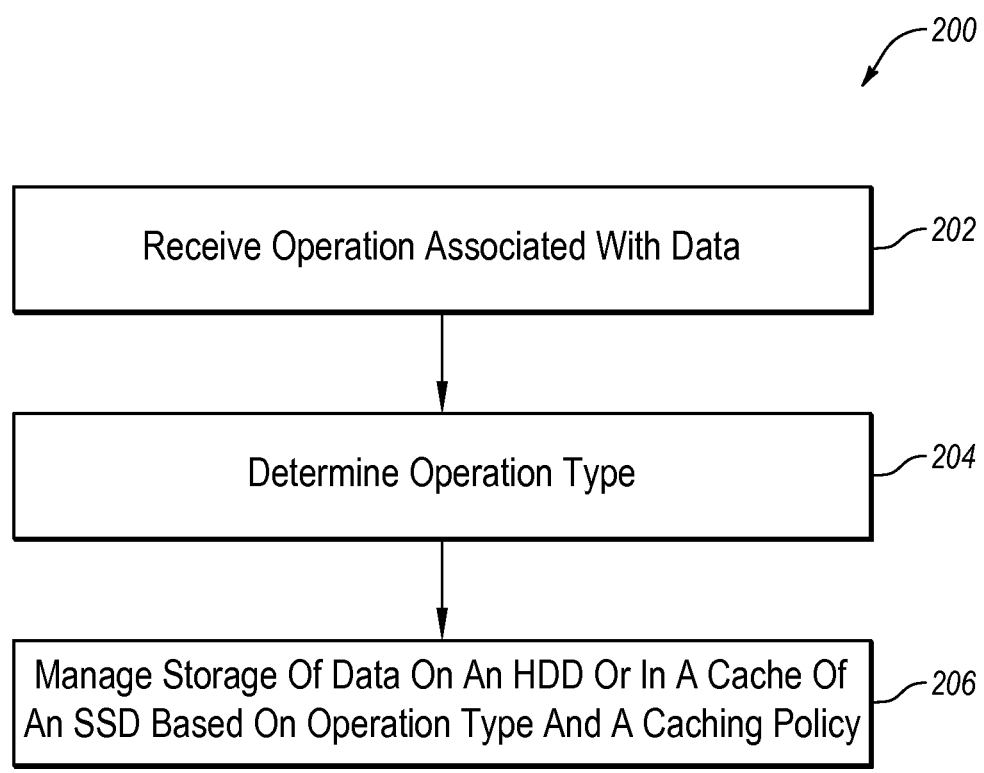
FIG. 2 is a flowchart of an example method of managing data storage on an electronic device.

FIG. 2 is a flowchart of an example method 200 of managing data storage on an electronic device, according to at least one embodiment described herein. One or more steps of the method 200 may be implemented, in some embodiments, by one or more components of the storage system 100 of FIG. 1 such as the storage manager 104. Although illustrated as discrete blocks, various blocks may be divided into additional blocks, combined into fewer blocks, or eliminated, depending on the desired implementation.

The method 200 may begin at block 202, where an operation associated with data may be received. For example, the storage manager 104 of FIG. 1 may intercept an operation intended for the storage space 105 of the electronic device 102. At block 204, a type of the operation received at block 202 may be determined. The operation may include any applicable operation that may be performed with respect to data and the storage space 105 and may include an open, close, read, and/or write operation. Accordingly, the specific operation type (e.g., open, close, read, write, etc.) may be determined at block 204.

At block 206, storage of the data on an HDD and in a cache of an SSD may be managed based on the operation type determined at block 204 and based on a cache policy such as the cache policy described above with respect to FIG. 1. For example, the cache policy may be based on one or more characteristics of the data, which may include size of a file associated with the data, frequency of access of the data, a number of times that the data has been previously accessed, a duration since previous access of the data, a creation time of the data, and type of the data. The managing of the data may include determining whether to store the data on the HDD and in the cache based on the cache policy, removing the data from the cache based on the cache policy, determining whether to transfer the data from the HDD to the cache based on the cache policy, and determining whether to transfer the data from the cache to the HDD based on the cache policy.

Figure 3:
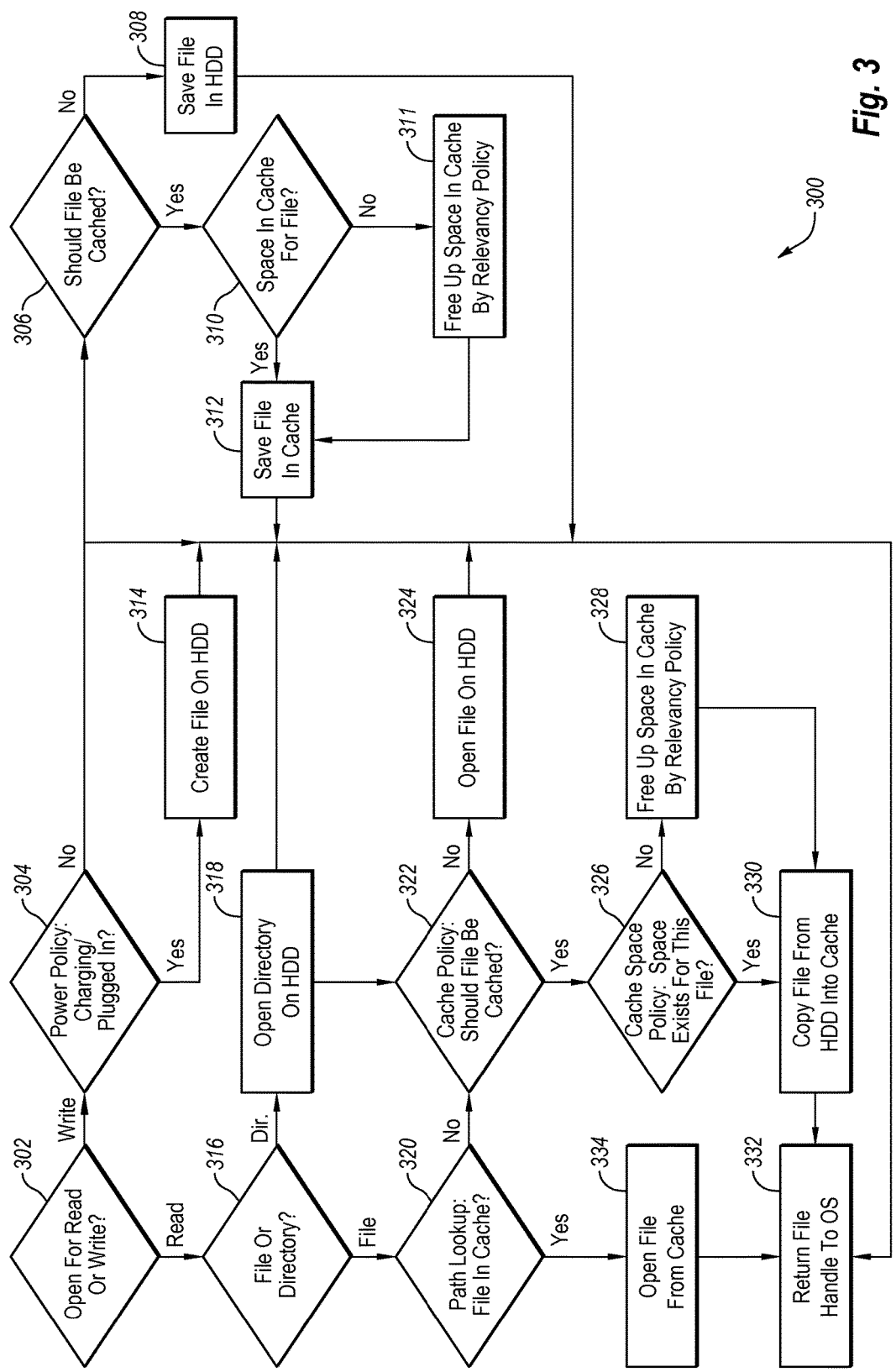
FIG. 3 is a flowchart of an example method of managing storage of data on an electronic device when an operation associated with the data is an "open" operation.
Figure 4:
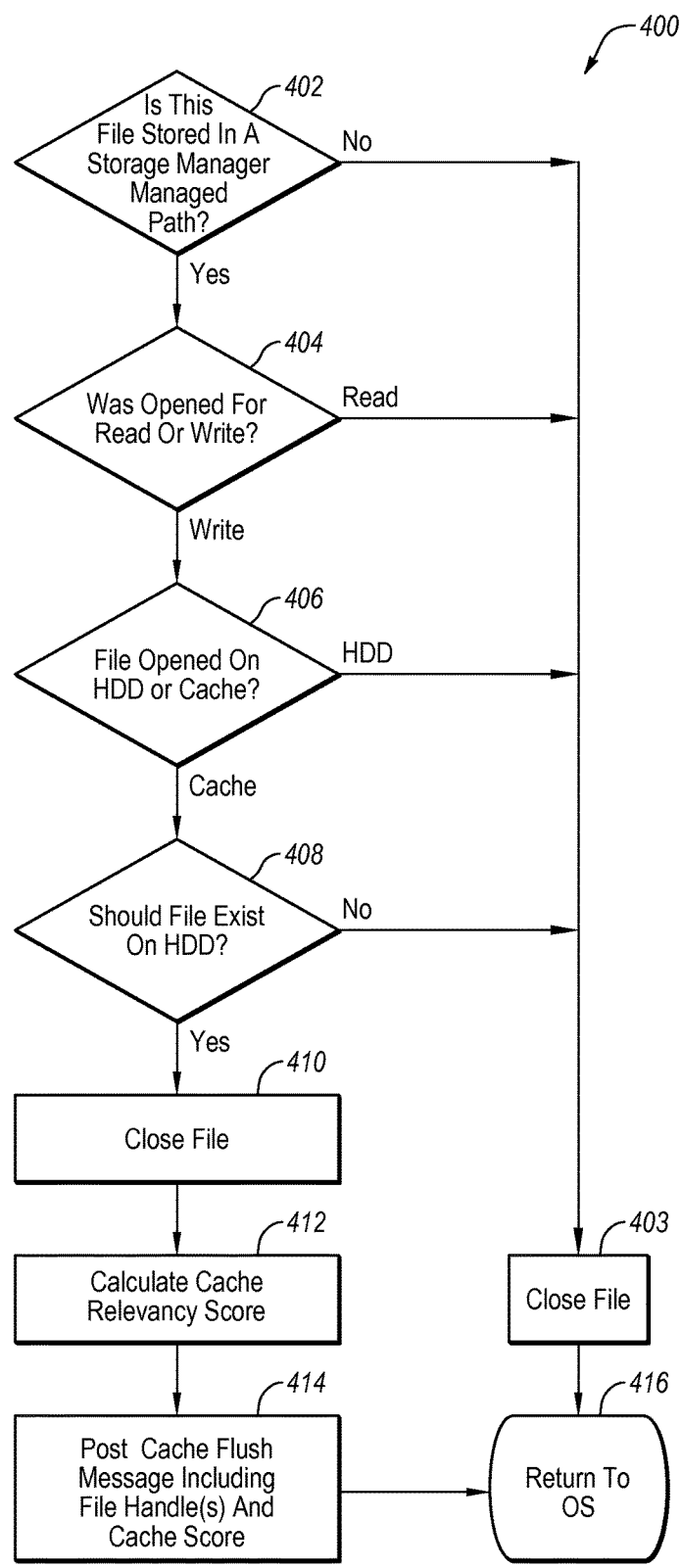
FIG. 4 is a flowchart of an example method of managing storage of data on an electronic device when an operation associated with the data is a "close" operation.
Figure 5:
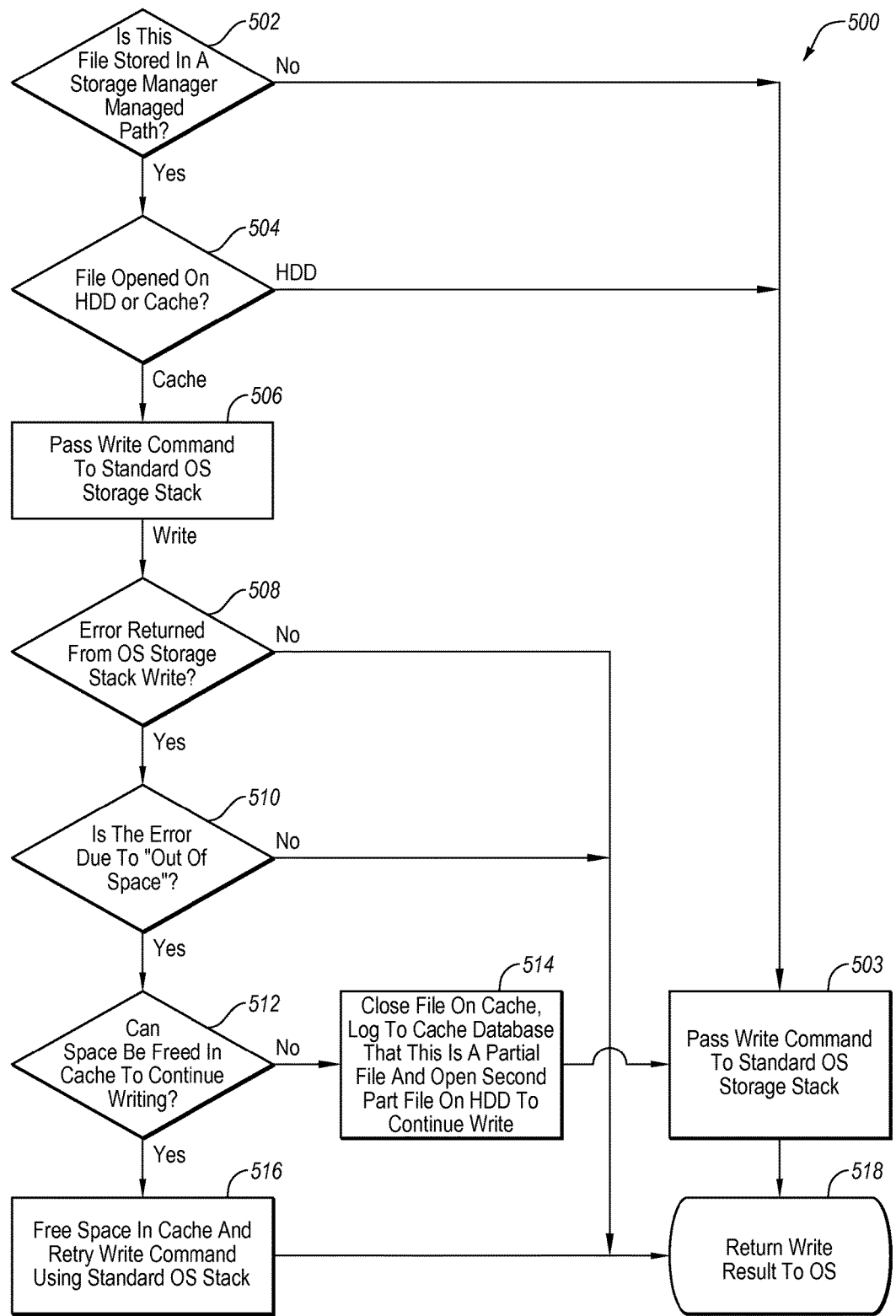
FIG. 5 is a flowchart of an example method of managing storage of data on an electronic device when an operation associated with the data is a "write" operation.

Method 300 of FIG. 3 illustrates a flowchart of an example method of managing storage of the data when the operation is an "open" operation, method 400 of FIG. 4 illustrates a flowchart of an example method of managing storage of the data when the operation is a "close" operation, and method 500 of FIG. 5 illustrates a flowchart of an example method of managing storage of the data when the operation is a "write" operation.

Accordingly, the method 200 may be performed to manage storage of data on an HDD and in a cache of an SSD based on operations associated with the data and the cache policy. Storage management of data in this manner may provide for improved energy efficiency associated with data storage using an HDD while also allowing for use of the HDD and its storage capacity potential.

One skilled in the art will appreciate that, for the method 200 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 200 may include further steps associated with assigning a rank to the data with respect to other data stored in the cache based on the cache policy and managing storage of the data on the HDD or the cache based on the rank. In these or other embodiments, the data may be assigned a score and managing storage of the data on the HDD and in the cache may be based on the assigned score. In these or other embodiments, the method 200 may include operations associated with determining whether to store the data on the HDD and in the cache based on a power state of the electronic device, as discussed below.

Further, in some embodiments, the method 200 may include blocks associated with generating a set of caching rules based on the cache policy and managing storage of the data on the hard disk drive and in the cache based on the set of caching rules. In these or other embodiments, the method 200 may include blocks associated with modifying the caching rules according to usage of the electronic device.

As mentioned above, FIG. 3 is a flowchart of an example method 300 of managing storage of data on an HDD and in a cache when an operation associated with the data is an "open" operation, according to at least one embodiment described herein. One or more steps of the method 300 may be implemented, in some embodiments, by one or more components of the storage system 100 of FIG. 1 such as the storage manager 104. Although illustrated as discrete blocks, various blocks may be divided into additional blocks, combined into fewer blocks, or eliminated, depending on the desired implementation.

The method 300 may begin at block 302, where it may be determined whether the "open" operation associated with the data is for reading the data or writing the data. When the "open" operation is for writing the data, the method 300 may proceed to block 304. When the "open" operation is for reading the data, the method 300 may proceed to block 316.

At block 304, it may be determined whether an electronic device configured to store the data (e.g., the electronic device 102 that includes the storage space 105 of FIG. 1) is in a first power state or a second power state. Block 304 may be applicable in instances where the electronic device may be powered by a battery source and where the cache policy may be based on increasing the life and amount of time between charges of the battery. Accordingly, the power policy may dictate whether or not to store the data on the HDD and/or cache the data in some embodiments based on whether or not the electronic device is in the first power state or the second power state.

The first power state may include any power state where it may be deemed that accessing the HDD may not be a large concern. For example, the first power state may include a state where the electronic device is not operating off of the battery (e.g., when the electronic device is plugged in) such energy use for accessing the HDD may not be a concern. In these or other embodiments, the first power state may include a state where the electronic device is operating off the battery but a power level of the battery is at or above a threshold such that accessing the HDD may be less of an issue than if the battery level were below the threshold. Additionally or alternatively, the first power state may include a state where the electronic device is operating off the battery but when the battery is also charging.

The second power state may include any power state where it may be deemed that accessing the HDD may be more problematic. For example, the second power state may include a state where the electronic device may be operating under battery power regardless of the power level of the battery. Additionally or alternatively, the second power state may include a state where the electronic device may be operating under battery power and when the power level is below a threshold.

If it is determined at block 304 that the electronic device is in the first power state, the method 300 may proceed from block 304 to block 314. At block 314, the data may be stored on the HDD. Following block 314, the method 300 may proceed to block 332 where a file handle associated with the data may be returned to the OS.

Returning to block 304, when the electronic device is determined to be in the second power state, the method 300 may proceed from block 304 to block 306 where it may be determined whether or not the data should be cached. In some embodiments, the determination may be made by applying caching rules to the data, where the caching rules may be based on a cache policy, such as described above with respect to FIG. 1. If it is determined that the data should not be cached, the method 300 may proceed from block 306 to block 308 where the data may be saved on the HDD of the electronic device. Following block 308, the method 300 may proceed to block 332 where a file handle associated with the data may be returned to an operating system (OS) of the electronic device.

Returning to block 306, if it is determined that the data should be cached, the method 300 may proceed from block 306 to block 310. At block 310, it may be determined whether or not the cache has space for the data. If there is space in the cache for the data, the method 300 may proceed from block 310 to block 312 where the data may be saved in the cache. Following block 312, the method 300 may proceed to block 332 where a file handle associated with the data may be returned to the OS.

Returning to block 310, if there is not space in the cache for the data, the method 300 may proceed from block 310 to block 311. At block 311, space may be freed up in the cache based on the cache policy. In some embodiments, the space may be freed up according to a relevancy policy that is based on the cache policy. For example, as mentioned above, in some embodiments, data and associated files stored in the cache may be given a particular score and/or rank based on one or more characteristics of the data such as file size, access frequency, and/or duration since the last access to a file. Accordingly, to free up space in the cache to store the data, one or more files may be removed from the cache based on their scores and/or rank as compared to other files stored on the cache, where the files with the lowest rank or score may be removed first. The files may be transferred from the cache to the HDD or simply deleted from the cache depending on the importance of maintaining the files on the electronic device. In some embodiments, the number of files removed from the cache may be based on the amount of space needed to free up in the cache and the size of the lowest priority files. Following block 311, the method 300 may proceed to block 332 where a file handle associated with the data may be returned to the OS.

Returning to block 302, if it is determined that the "open" operation is associated with reading the data, the method 300 may proceed from block 302 to block 316, where it may be determined whether the data is a file type or a directory type. If the data is a directory type, the method 300 may proceed from block 316 to block 318. At block 318, a directory stored on the HDD and associated with the data may be opened. Following block 318, the method 300 may proceed to block 332 where a file handle associated with the data may be returned to the OS.

Returning to block 316, if the data is a file type, the method 300 may proceed from block 316 to block 320. At block 320 it may be determined whether the data and associated file are already stored in the cache. For example, a cache lookup table such as the cache lookup table 124 of FIG. 1 may be referenced to determine whether the data and associated file are already stored in the cache. If the data and associated file are already stored in the cache, the method 300 may proceed from block 320 to block 334. At block 334, the file associated with the data may be opened from the cache. Following block 334, the method 300 may proceed to block 332 where a file handle associated with the data may be returned to the OS.

Returning to block 320, if the file associated with the data is not already stored in the cache, the method 300 may proceed from block 320 to block 322. At block 322, it may be determined whether the file should be cached. In some embodiments, the determination may be made by applying caching rules to the file, where the caching rules may be based on a cache policy, such as described above with respect to FIG. 1. If it is determined that the file should not be cached, the method 300 may proceed from block 322 to block 324 where the file may be opened from the HDD of the electronic device. Following block 324, the method 300 may proceed to block 332 where a file handle associated with the data may be returned to the OS.

Returning to block 322, if it is determined that the file should be cached, the method 300 may proceed from block 322 to block 326. At block 326, it may be determined whether or not the cache has space for the file. If there is space in the cache for the file, the method 300 may proceed from block 326 to block 330 where the file may be copied from the HDD to the cache. Following block 330, the method 300 may proceed to block 332 where a file handle associated with the data may be returned to the OS.

Returning to block 326, if there is not space in the cache for the file, the method 300 may proceed from block 326 to block 328. At block 328, space may be freed up in the cache based on the cache policy. Similar to as described above with respect to block 311, in some embodiments, the space may be freed up at block 328 according to a relevancy policy that is based on the cache policy.

Accordingly, the method 300 may be performed to manage storage of data on an HDD and in a cache of an SSD based on an "open" operation associated with the data and based on the cache policy. Storage management of data in this manner may provide for improved energy efficiency associated with data storage using an HDD while also allowing for use of the HDD and its storage capacity potential.

One skilled in the art will appreciate that, for the method 300 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 4 is a flowchart of an example method 400 of managing storage of data on an HDD and in a cache when an operation associated with the data is a "close" operation, according to at least one embodiment described herein. One or more steps of the method 400 may be implemented, in some embodiments, by one or more components of the storage system 100 of FIG. 1 such as the storage manager 104. Although illustrated as discrete blocks, various blocks may be divided into additional blocks, combined into fewer blocks, or eliminated, depending on the desired implementation.

The method 400 may begin at block 402, where it may be determined whether the data and its associated file that are related to the "close" operation are stored in a path managed by a storage manager configured to manage caching operations. For example, the storage manager 104 of FIG. 1 may determine whether data associated with an intercepted "close" operation is stored in the portions of the storage space 105 that are managed by the storage manager 104. If the data and its associated file are not stored in a storage manager managed path, the method 400 may proceed from block 402 to block 403 where the file associated with the data may be closed. Following block 403, the method 400 may proceed to block 416 where handling of the data may be returned from the storage manager to the OS of the electronic device.

Returning to block 402, if the file associated with the data is stored in a storage manager managed path, the method 400 may proceed from block 402 to block 404. At block 404, it may be determined whether the file was opened for a read operation or a write operation. If the file was opened for a read operation, the method 400 may proceed from block 404 to block 403, where the file may be closed.

Returning to block 404, if the file was opened for a write operation, the method 400 may proceed from block 404 to block 406. At block 406, it may be determined whether the file was opened from the HDD or from the cache. If the file was opened from the HDD, the method 400 may proceed from block 406 to block 403 where the file may be closed. If the file was opened from the cache, the method may proceed from block 406 to block 408.

At block 408, it may be determined whether the file that is to be closed and that is stored on the cache should also be stored on the HDD. If the file should not be stored on the HDD, the method 400 may proceed from block 408 to block 403 where the file may be closed. If the file should be stored on the HDD, the method 400 may proceed from block 408 to block 410. At block 410, the file may be closed.

Figure 6:
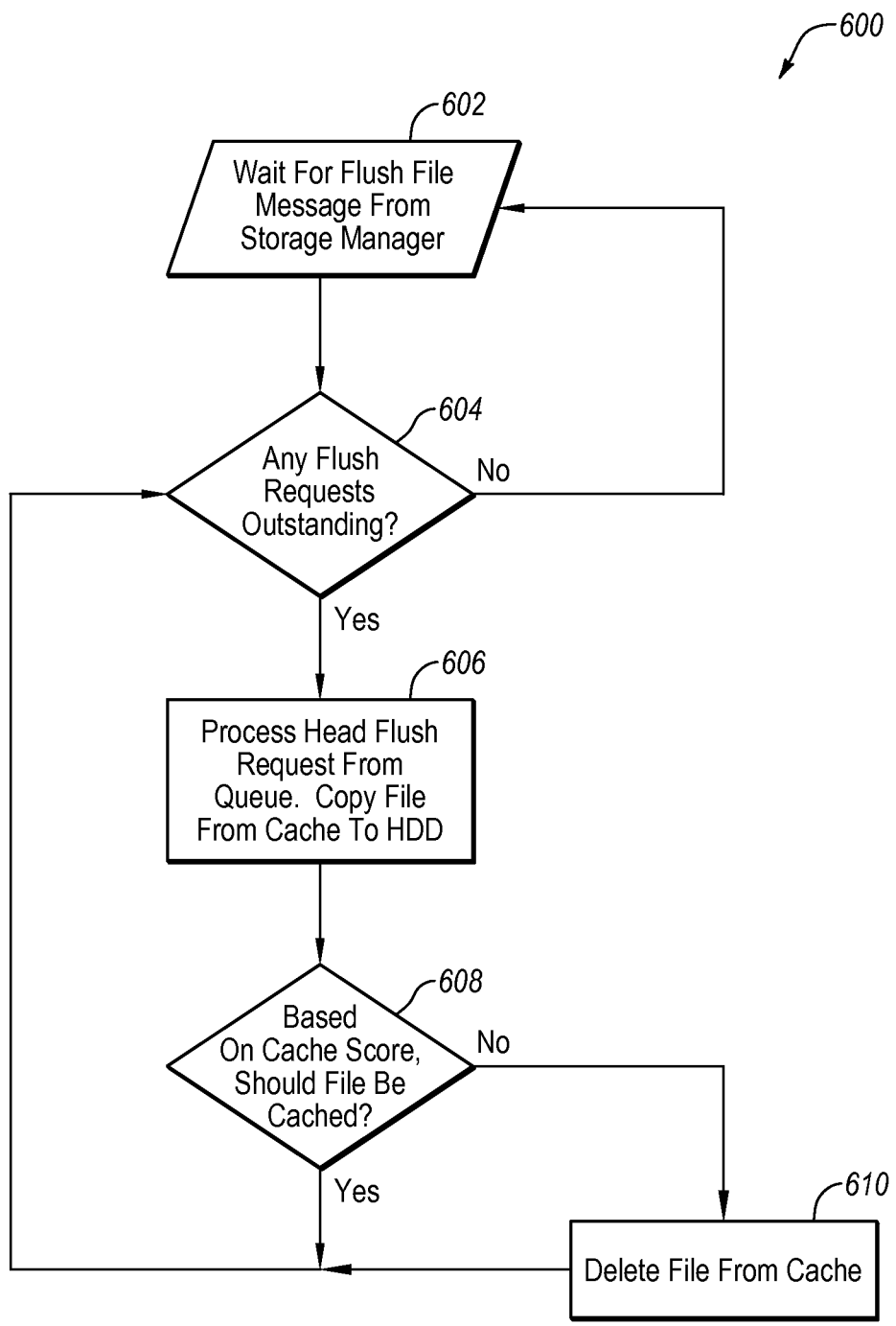
FIG. 6 is a flowchart of an example method of managing removal of data from a cache.

At block 412, a cache relevancy score, such as the relevancy score described with respect to blocks 311 and 328 of FIG. 3 may be determined for the file. At block 414, a cache flush message that includes the cache relevancy score for the file may be posted. Method 600 described below with respect to FIG. 6 illustrates an example of how the cache flush message may be handled.

Accordingly, the method 400 may be performed to manage storage of data on an HDD and in a cache of an SSD based on a "close" operation associated with the data and based on the cache policy. Storage management of data in this manner may provide for improved energy efficiency associated with data storage using an HDD while also allowing for use of the HDD and its storage capacity potential.

One skilled in the art will appreciate that, for the method 400 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 5 is a flowchart of an example method 500 of managing storage of data on an HDD and in a cache when an operation associated with the data is a "write" operation, according to at least one embodiment described herein. One or more steps of the method 500 may be implemented, in some embodiments, by one or more components of the storage system 100 of FIG. 1 such as the storage manager 104. Although illustrated as discrete blocks, various blocks may be divided into additional blocks, combined into fewer blocks, or eliminated, depending on the desired implementation.

The method 500 may begin and at block 502 it may be determined whether the data and its associated file that are related to the "write" operation are stored in a path managed by a storage manager configured to manage caching operations. If the data and its associated file are not stored in a storage manager managed path, the method 500 may proceed from block 502 to block 503 where a write command may be passed to a standard OS storage stack. Following block 503, the method 500 may proceed to block 518 where the write result may be returned to the OS.

Returning to block 502, if the file associated with the data is stored in a storage manager managed path, the method 500 may proceed from block 502 to block 504. At block 504, it may be determined whether the file was opened from the HDD or from the cache. If the file was opened from the HDD, the method 500 may proceed from block 504 to block 503, where the write command may be passed to the standard OS storage stack such that the data and associated file may be written in the HDD and the method may proceed from block 503 to block 518. If the file was opened from the cache as determined at block 504, the method 500 may proceed from block 504 to block 506.

At block 506, the write command may be passed to the standard OS storage stack such that the data and its associated file may be written in the cache and the method 500 may proceed from block 506 to block 508. At block 508, it may be determined whether an error returned from the OS storage stack. If no error is returned, the method 500 may proceed from block 508 to block 518 where the write result may be returned to the OS. If an error is returned, the method 500 may proceed from block 508 to block 510.

At block 510, it may be determined whether the error is due to a lack of space in the cache. If the error is not due to a lack of space in the cache, the method 500 may proceed from block 510 to block 518. If the error is due to a lack of space in the cache, the method 500 may proceed from block 510 to block 512.

At block 512, it may be determined whether or not space may be freed in the cache to continue writing to the cache. If space may be freed in the cache, the method 500 may proceed to block 516 from block 512. At block 516, space may be freed up in the cache. In some embodiments, the space may be freed according to a relevancy score such as described above with respect to blocks 311 and 328 in FIG. 3. In some embodiments, the number of files removed from the cache may be based on the amount of space needed to free up in the cache and the size of the lowest priority files. Following block 516, the method 500 may proceed to block 518.

Returning to block 512, if space may not be freed in the cache as determined at block 512, the method 500 may proceed from block 512 to block 514. At block 514, the file associated with the data may be closed and logged to a cache database such as a cache lookup table. It may be logged that the file is a partial file due to the write not being able to be completed because of lack of space on the cache. In some embodiments, the file may be opened on the HDD to continue the write that was not able to finish. Following block 514, the method 500 may proceed to block 518.

Accordingly, the method 500 may be performed to manage storage of data on an HDD and in a cache of an SSD based on a "write" operation associated with the data and based on the cache policy. Storage management of data in this manner may provide for improved energy efficiency associated with data storage using an HDD while also allowing for use of the HDD and its storage capacity potential.

One skilled in the art will appreciate that, for the method 500 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 6 is a flowchart of an example method 600 of managing removal of data from the cache (also referred to as "flushing the cache"), according to at least one embodiment described herein. One or more steps of the method 600 may be implemented, in some embodiments, by one or more components of the storage system 100 of FIG. 1 such as the storage manager 104. Although illustrated as discrete blocks, various blocks may be divided into additional blocks, combined into fewer blocks, or eliminated, depending on the desired implementation.

The method 600 may begin at block 602 where a flush file message may be waited for. For example, at block 602 a flush file message such as the flush file message posted in block 414 of FIG. 4 may be anticipated. The flush file message may be associated with determining whether or not to flush a particular file from the cache. Additionally, the flush file message may be received when the particular file stored on the cache has been closed after a write operation was performed with respect to the particular file.

When a flush file message is received at block 602, the method 600 may proceed to block 604. At block 604, it may be determined whether any flush requests are outstanding. If a flush request is outstanding, such as the flush request caused by the flush file message that triggers the transition from block 602 to block 604, the method 600 may proceed from block 604 to block 606.

At block 606, the particular file associated with the flush file message may be copied from the cache to the HDD. In some instances, a series of flush file messages may be outstanding and their corresponding files may be placed in a queue. Accordingly, the particular file may be selected from the queue according to some embodiments.

At block 608, it may be determined whether the particular file should be stored in the cache based on a cache relevancy score associated with the particular file. If it is determined that the particular file should not be stored in the cache, the method 600 may proceed to block 610 where the particular file may be deleted from the cache. If it is determined that the particular file should be stored in the cache, the method 600 may proceed to block 604 where it may be determined if any other flush requests are outstanding.

If no flush requests are outstanding, the method 600 may proceed from block 604 back to block 602. This may typically occur after operations associated with handling the flush message received at block 602 have been performed and no other flush messages have been received in the meantime.

Accordingly, the method 600 may be used to manage removal of data and associated files from the cache. One skilled in the art will appreciate that, for the method 600 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

As indicated above, the embodiments described herein may include the use of a special-purpose or general-purpose computer (e.g., the processors 150 of FIG. 1) including various computer hardware or software modules, as discussed in greater detail below.

Embodiments described herein may be implemented using computer-readable for carrying or having computer-executable instructions or data structures stored thereon. Such computer-readable media may be any available media that may be accessed by a general-purpose or special-purpose computer. By way of example, and not limitation, such computer-readable media may include tangible computer-readable storage media including RAM, ROM, EEPROM, CD-ROM or other optical disk storage, magnetic disk storage or other magnetic storage devices, flash memory devices (e.g., solid-state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the claims is not necessarily limited to the specific features or acts described above. Rather, the specific features and acts described above are disclosed as example forms of implementing one or more embodiments of the present disclosure and claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

For example, the caching operations have been described above with respect to an SSD and an HDD where data may be cached on the SSD such that accessing the HDD may be reduced. However, the caching operations may be performed with respect to any differing types of storage media where storage space may be less expensive on a first storage medium than a second storage medium but where the second storage medium may have better performance (e.g., energy efficiency) than the first storage medium. Accordingly, the caching operations and principles of the present disclosure are not limited to particular types of storage media although the above description gives the specific examples of an SSD and an HDD.

Embodiments of the present disclosure can be further illustrated by reference to the following claims, which relate to various aspects of the present disclosure.

What is claimed is:

1. A method comprising:
receiving an operation associated with data;
determining an operation type of the operation, the operation type being an open operation or a close operation; and
managing storage of the data on a hard disk drive of an electronic device and in a cache on a solid-state storage medium of the electronic device based on:
the determined operation type;
a determination that the electronic device is operating on battery power; and
a cache policy that is based on:
reducing access to the hard disk drive according to characteristics of the data that include size of a file associated with the data, frequency of access of the data, a total number of times that the data has been previously accessed, a duration since a previous access of the data, a creation time of the data, and type of the data;
reducing spinning time of the hard disk drive according to a relationship between file sizes and spinning time of the hard disk drive with respect to transferring data corresponding to the file sizes between the cache and the hard disk drive;
controlling a potential number of files or data sets to store on the cache by setting a maximum size of each file allowed to be stored on the cache; and
preventing storage of partial files in the cache.

2. The method of claim 1, wherein managing storage of the data comprises one or more of:
determining whether to store the data on the hard disk drive and in the cache based on the cache policy;
removing the data from the cache based on the cache policy;
determining whether to transfer the data from the hard disk drive to the cache based on the cache policy; and
determining whether to transfer the data from the cache to the hard disk drive based on the cache policy.

3. The method of claim 1, further comprising assigning a rank to the data with respect to other data stored in the cache based on the cache policy and managing storage of the data on the hard disk drive or the cache based on the rank.

4. The method of claim 1, further comprising assigning a score to the data based on the cache policy and managing storage of the data on the hard disk drive or the cache based on the score.

5. The method of claim 1, further comprising generating a set of caching rules based on the cache policy and managing storage of the data on the hard disk drive and in the cache based on the set of caching rules.

6. The method of claim 5, further comprising modifying the caching rules according to usage of the electronic device.

7. A non-transitory computer-readable storage medium including instructions that cause a system to perform operations, the operations comprising:
receiving an operation associated with data; and
managing storage of the data on a first storage medium of an electronic device and in a cache on a second storage medium of the electronic device based on an operation type of the operation and a cache policy, the cache policy being based on:
reducing access to the first storage medium according to one or more characteristics of the data that include a duration since a previous access of the data and a relationship between file sizes and access time of the first storage medium with respect to transferring data corresponding to the file sizes between the cache and the first storage medium;
controlling a potential number of files or data sets to store on the cache by setting a maximum size of each file allowed to be stored on the cache; and
preventing storage of partial files in the cache.

8. The non-transitory computer-readable storage medium of claim 7, wherein the one or more characteristics of the data include one or more of the following:
size of a file associated with the data, frequency of access of the data, a total number of times that the data has been previously accessed, and a creation time of the data.

9. The non-transitory computer-readable storage medium of claim 7, wherein managing storage of the data comprises one or more of:
determining whether to store the data on the first storage medium and in the cache based on the cache policy;
removing the data from the cache based on the cache policy;
determining whether to transfer the data from the first storage medium to the cache based on the cache policy; and
determining whether to transfer the data from the cache to the first storage medium based on the cache policy.

10. The non-transitory computer-readable storage medium of claim 7, wherein the operations further comprise assigning a rank to the data with respect to other data stored in the cache based on the cache policy and managing storage of the data on the first storage medium or the cache based on the rank.

11. The non-transitory computer-readable storage medium of claim 7, wherein the operations further comprise assigning a score to the data based on the cache policy and managing storage of the data on the first storage medium or the cache based on the score.

12. The non-transitory computer-readable storage medium of claim 7, wherein the operation type includes one or more of the following:
an open operation, a close operation, a read operation, and a write operation.

13. The non-transitory computer-readable storage medium of claim 7, further comprising managing storage of the data on the first storage medium and in the cache based on a determination that the electronic device is operating on battery power.

14. The non-transitory computer-readable storage medium of claim 7, wherein the operations further comprise generating a set of caching rules based on the cache policy and managing storage of the data on the first storage medium and in the cache based on the set of caching rules.

15. The non-transitory computer-readable storage medium of claim 14, wherein the operations further comprise modifying the caching rules according to usage of the electronic device.

16. The non-transitory computer-readable storage medium of claim 7, wherein the first storage medium includes a hard disk drive and the second storage medium includes a solid-state storage medium.

17. A non-transitory computer-readable storage medium including instructions that cause a system to perform operations, the operations comprising:
receiving an operation associated with data;
generating a set of caching rules based on a cache policy configured to reduce accessing a first storage medium of an electronic device, the cache policy being based on one or more characteristics of the data, a relationship between file sizes and access time of the first storage medium for transferring data with corresponding file sizes between a cache on a second storage medium the electronic device and the first storage medium, and preventing storage of partial files in the cache; and
managing storage of the data on the first storage medium and in the cache based on the operation, the set of caching rules, and a determination that the electronic device is operating on battery power.

18. The non-transitory computer-readable storage medium of claim 17, wherein the cache policy is based on controlling a potential number of files or data sets to store on the cache by selecting a maximum size of each file allowed to be stored on the cache.

19. The non-transitory computer-readable storage medium of claim 17, wherein the first storage medium includes a hard disk drive and the cache policy is based on reducing spinning time of the hard disk drive according to a relationship between the file sizes and spinning time of the hard disk drive for transferring the data with the corresponding file sizes between the cache and the hard disk drive.

20. The non-transitory computer-readable storage medium of claim 18, wherein the operations further comprise assigning a rank to the data with respect to other data stored in the cache based on the cache policy and managing storage of the data on the hard disk drive or the cache based on the rank.

* * * * *